US007814939B2

(12) United States Patent
Bernhard

(10) Patent No.: US 7,814,939 B2
(45) Date of Patent: Oct. 19, 2010

(54) METHOD OF OPERATING A BEVERAGE BOTTLING PLANT WITH A BEVERAGE FILLING MACHINE FOR FILLING BEVERAGE BOTTLES, AND A METHOD AND APPARATUS FOR MONITORING BEVERAGE BOTTLE OR CONTAINER HANDLING MACHINES IN THE BEVERAGE BOTTLING PLANT

(75) Inventor: Herbert Bernhard, Wolfsheim (DE)

(73) Assignee: KHS Maschinen- und Anlagenbau AG, Dortmund (DE)

( * ) Notice: Subject to any disclaimer, the term of this patent is extended or adjusted under 35 U.S.C. 154(b) by 1138 days.

(21) Appl. No.: 11/483,388

(22) Filed: Jul. 7, 2006

(65) Prior Publication Data

US 2007/0017593 A1 Jan. 25, 2007

(30) Foreign Application Priority Data

Jul. 7, 2005 (DE) ...................... 10 2005 031 794

(51) Int. Cl.
*B65B 1/04* (2006.01)
*G06K 9/00* (2006.01)

(52) U.S. Cl. .............................. 141/1; 141/83; 141/94; 141/144; 348/127; 382/142

(58) Field of Classification Search .................... 141/1, 141/83, 94, 144–147, 157, 159; 209/522; 348/127; 250/221, 223 B; 356/240.1; 382/142
See application file for complete search history.

(56) References Cited

U.S. PATENT DOCUMENTS

| | | | | | |
|---|---|---|---|---|---|
| 4,380,025 | A | * | 4/1983 | Deane | 348/133 |
| 4,413,738 | A | * | 11/1983 | Pemberton et al. | 209/523 |
| 4,691,231 | A | * | 9/1987 | Fitzmorris et al. | 348/127 |
| 4,878,333 | A | | 11/1989 | Sommerfield | |
| 4,931,632 | A | * | 6/1990 | Brandt | 250/223 B |
| 4,972,882 | A | * | 11/1990 | Kohashi | 141/1 |
| 5,297,597 | A | | 3/1994 | Herzog | |
| 5,425,385 | A | * | 6/1995 | Kuta et al. | 134/48 |
| 5,538,054 | A | * | 7/1996 | L uhmann et al. | 141/198 |
| 6,145,552 | A | * | 11/2000 | Price et al. | 141/135 |
| 7,322,160 | B2 | * | 1/2008 | Herzog | 53/75 |

FOREIGN PATENT DOCUMENTS

| | | |
|---|---|---|
| DE | 3120603 A1 | 12/1982 |
| DE | 33 13 361 | 10/1984 |

* cited by examiner

*Primary Examiner*—Timothy L Maust
(74) *Attorney, Agent, or Firm*—Nils H. Ljungman & Associates

(57) ABSTRACT

Method of operating a beverage bottling plant with a beverage filling machine for filling beverage bottles, and a method and apparatus for monitoring beverage bottle or container handling machines in the beverage bottling plant.

20 Claims, 8 Drawing Sheets

METHOD OF OPERATING A BEVERAGE BOTTLING PLANT WITH A BEVERAGE FILLING MACHINE FOR FILLING BEVERAGE BOTTLES, AND A METHOD AND APPARATUS FOR MONITORING BEVERAGE BOTTLE OR CONTAINER HANDLING MACHINES IN THE BEVERAGE BOTTLING PLANT

BACKGROUND

1. Technical Field

This application relates to a method and an apparatus for the monitoring of an automatic container handling and treatment station such as a bottling, capping and labeling machine, for the correct and essentially error-free handling and treatment of the containers such as bottles, cans and similar items to be processed.

2. Background Information

The large number and variety of machines that are classified as container handling and treatment plants are frequently unable to guarantee a continuous and uninterrupted flow of containers from one part of the machine to another on account of what are generally only minor disruptions or malfunctions of individual machines. For this reason, various attempts and developments have been made in an attempt to achieve an optimal regulation of the equipment. However, these adjustments and adaptations require significant effort and expense in terms of the electronic and mechanical equipment involved which, under the severe operating conditions found in container handling and bottling plants is not always sufficient or cannot withstand these harsh conditions.

For example, in one method of the prior art, for the determination of the capacity and the number of containers that can be accommodated in handling and treatment machines that process containers in the form of kegs, such as cleaning machines, for example, the output capacity is continuously determined mathematically based on the number of containers input, the treatment time and the capacity, as well as on the current fill level of the machine, and the factor that is determined in this manner is used to regulate the capacity of the machine itself and/or the capacity of additional associated machines (German Patent No. A1 31 20 603).

With this method of the prior art, especially for the cleaning of entire plants, disruptions that are caused by the handling machines that store kegs are detected and can be used to influence associated machines. In this case it is further possible to influence the container handling and treatment machine in question in terms of its operation. In the case of a problem on the input side, after the passage of the hold time, which is a function of the throughput capacity, the problem has an effect on the output capacity of the machine and causes a difference in this capacity, for example by means of a tachogenerator or an output capacity that can theoretically be determined in another manner. To this extent, with the method of the prior art, the output capacity can be determined from the number of kegs input and stored and from the current filling level. The resulting data can be used to regulate the output or for the general regulation of this treatment and handling machine and/or in the context of the overall plant.

German Patent No. 41 37 319 C2 also describes a method for the monitoring of a labeling machine with which the number of objects entering the machine, the temperature and the quantity of the adhesive used in the same period of time, are monitored, from those values a quotient that characterizes a specific adhesive consumption and the temperature of the adhesive can be regulated to set the specific adhesive consumption. For monitoring of the labeling machine, a sensor is provided to detect the number of incoming objects, with a measurement device for the continuous determination of the quantity of adhesive consumed in the same interval of time, a temperature sensor, an evaluation device and finally a tempering device. In both the methods of the prior art, for the determination of a theoretical throughput, the number of incoming containers is referenced and used as a basis for the calculations.

OBJECT OR OBJECTS

The object of at least one possible embodiment, taking into consideration the closest prior art, is to perform a monitoring so that problems within a plant, a plant block or an individual machine can be detected essentially immediately, disregarding any potential equipment response time.

SUMMARY

This object can be accomplished in a method of the type described above in that with a first inspection measure, the number of containers entering the machine one after another is recorded, and with a second inspection measure, the number of containers exiting the machine one after the other is recorded, and whereby when there is a change in the number of exiting containers compared to the number of entering containers, a fault message is generated and is used for the immediate or later action for the operation of the handling and treatment plant. In the case of immediate action, a problem of this type triggers an immediate stopping signal for the handling or treatment machine in question.

Additional features of at least one possible embodiment are described herein.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one possible embodiment is explained in greater detail below, which is illustrated in the accompanying drawings. In the drawings.

DESCRIPTION OF EMBODIMENT OR EMBODIMENTS

Figure 1A:
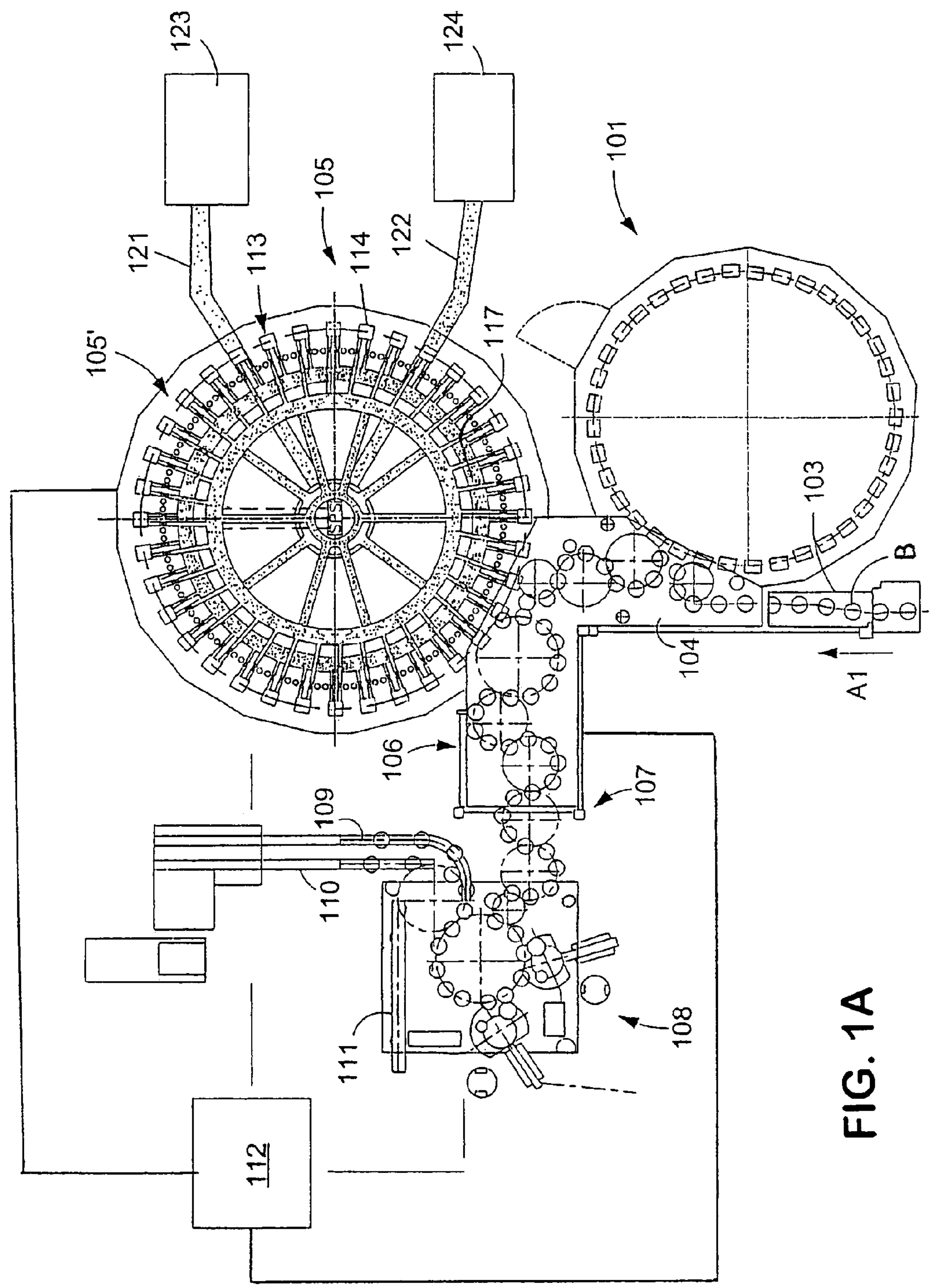
FIG. 1A is a schematic illustration of a container filling plant in accordance with one possible embodiment.

FIG. 1A shows schematically the main components of one possible embodiment example of a system for filling containers, specifically, a beverage bottling plant for filling bottles B with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles B, are fed in the direction of travel as indicated by the arrow A1, by a first conveyer arrangement 103, which can be a linear conveyor or a combination of a linear conveyor and a starwheel. Downstream of the rinsing arrangement or rinsing station 101, in the direction of travel as indicated by the arrow A1, the rinsed bottles B are transported to a beverage filling machine 105 by a second conveyer arrangement 104 that is formed, for example, by one or more starwheels that introduce bottles B into the beverage filling machine 105.

The beverage filling machine 105 shown is of a revolving or rotary design, with a rotor 105', which revolves around a central, vertical machine axis. The rotor 105' is designed to receive and hold the bottles B for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles B to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle B, the first product or the second product can be filled by means of an appropriate control of the filling product or fluid valves.

Downstream of the beverage filling machine 105, in the direction of travel of the bottles B, there can be a beverage bottle closing arrangement or closing station 106 which closes or caps the bottles B. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles B. In the embodiment shown, the labeling arrangement 108 has three output conveyer arrangement: a first output conveyer arrangement 109, a second output conveyer arrangement 110, and a third output conveyer arrangement 111, all of which convey filled, closed, and labeled bottles B to different locations.

The first output conveyer arrangement 109, in the embodiment shown, is designed to convey bottles B that are filled with a first type of liquid beverage supplied by, for example, the supply reservoir 123. The second output conveyer arrangement 110, in the embodiment shown, is designed to convey bottles B that are filled with a second type of liquid beverage supplied by, for example, the supply reservoir 124. The third output conveyer arrangement 111, in the embodiment shown, is designed to convey incorrectly labeled bottles B. To further explain, the labeling arrangement 108 can comprise at least one beverage bottle inspection or monitoring device that inspects or monitors the location of labels on the bottles B to determine if the labels have been correctly placed or aligned on the bottles B. The third output conveyer arrangement 111 removes any bottles B which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

The scope of the present application extends not only to the rotation of the four-corner packages currently being handled, but also includes the rotation of packages with 2, 3 or n corners.

Figure 1:
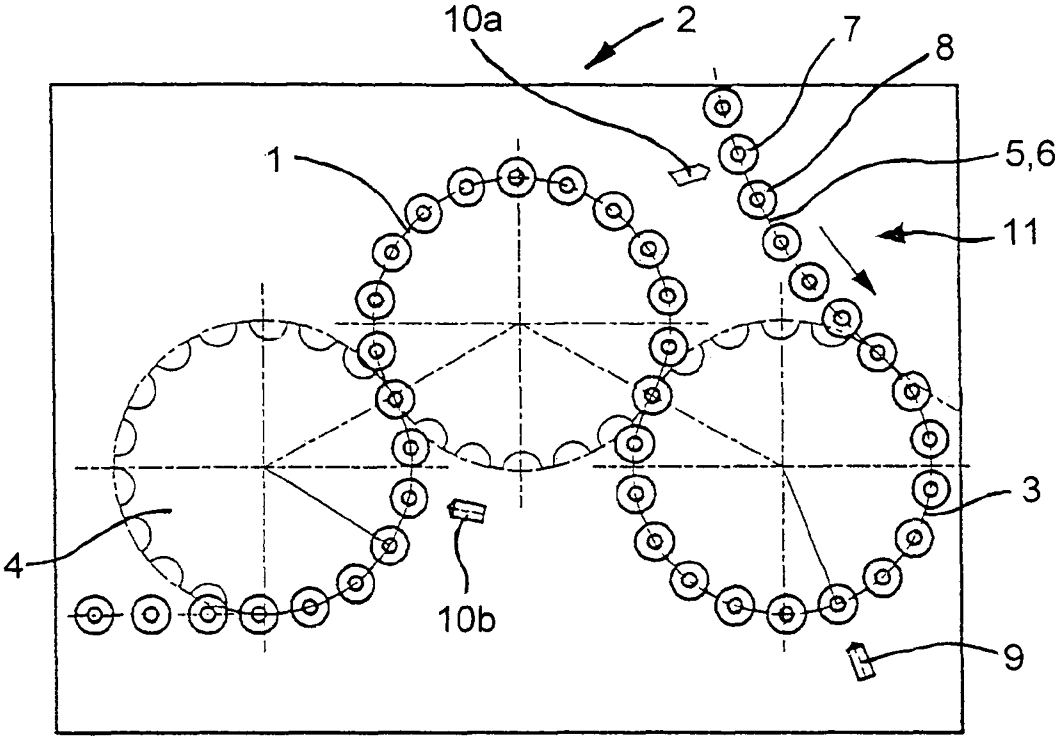
FIG. 1 is an overhead view of a capping machine.

The drawing in FIG. 1 is a simplified plan view from overhead of the rotary turntable 1 of a capping machine 2, which has an inlet star wheel 3 and an outlet star wheel 4. A portion of the rotor 5 of an upstream filling machine 6, which is constructed in a modular fashion by way of example, is visible in the right plane of the drawing. These machines, to which reference is made by way of example, are used for the handling and treatment of containers such as bottles 7 and similar containers, and the machines have stationary or vertically movable support plates 8 to support or to hold these bottles 7 during the handling and treatment process.

Figure 2:
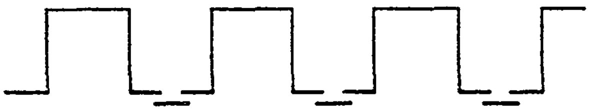
FIG. 2 is a schematic illustration of one potential arrangement of the circulation through such a machine.

As shown in the drawing, in the vicinity of the inlet star wheel 3 and of the outlet star wheel 4, there are inspection points 10*a* and 9 on the inlet side and 10*b* on the outlet side which can be equipped with appropriate counting or metering devices. For example, at the first inspection point 9, in a first inspection measure the number of containers in the form of bottles 7 entering and fed in one after another is counted. In a second inspection measure, at the additional test point 10*b* located on the outlet side, the number of bottles 7 exiting one after another is recorded. When there is a change in the number of bottles 7 being discharged compared to the number of bottles entering, a fault message is generated immediately, which then preferably triggers a stop signal for the capping machine. A stop or shutdown action of this type can also be initiated on a delayed basis, for example, by storing a plurality of fault signals in sequence and initiating the stop action after a specified number or frequency of such signals is reached. It is of course possible to leave the upstream filling machine 6 in operation after such a monitoring process, in which case test points 9, 10*a*, and 10*b* can be integrated into the inlet and outlet areas 11 (not shown). A test point 9 of the capping machine can also be located in the outlet area of the filling machine 6 and vice versa. An additional measure can consist of a system that couples such test points 9, 10*a*, and 10*b* for a plurality of machines. This type of arrangement is particularly important when the plant consists of a plurality of handling and treatment machines that are switched together in a modular or block construction. In such a case it may be advantageous to determine the number of bottles 7 that are input on the inlet side and removed on the outlet side for each machine separately, and in the event of a fault signal from any particular machine to shut down the handling and treatment machines located one after the other in the throughput direction in sequence, e.g. after they have been emptied. In this manner, the entire filling block can be run empty and checked or inspected. It may also be important for the machines that are arranged in sequence in the direction of flow of the bottles 7 to be stopped only after they have been completely emptied. The inspection segments that are located between the test points 10*a*, 9, and 10*b* can also be divided into additional individual test segments and be evaluated separately or work together in connection with the additional inspection segments via electronic means and be evaluated jointly. For the counting, recording and continuous comparison of the containers 7 moving through the test segments, a central control unit (not shown) is provided, the evaluation of the results from which is used to actuate the handling and treatment machine 2, 6 in question. The control device provided for this purpose has a processing unit for the storage of a signal that corresponds to the potential number of containers present in a test segment or also handling spaces in this regard, for the receipt of inputs and counting pulses of the bottles 7 determined at the inspection points and to store the number of containers determined and to compare said data with the output of a fault signal. The inspection points 10*a*, 9, 10*b* can be equipped with photocell counting devices, counting cameras and with measurement sensors or similar devices that respond to reflection. As shown in FIG. 2, in connection with the machine cycle, a pulse can be opened, which is then bridged or short-circuited across the measurement devices and sensor as well as a shift register. If no such bridging or short-circuiting occurs, the corresponding fault is signaled.

Figure 3:
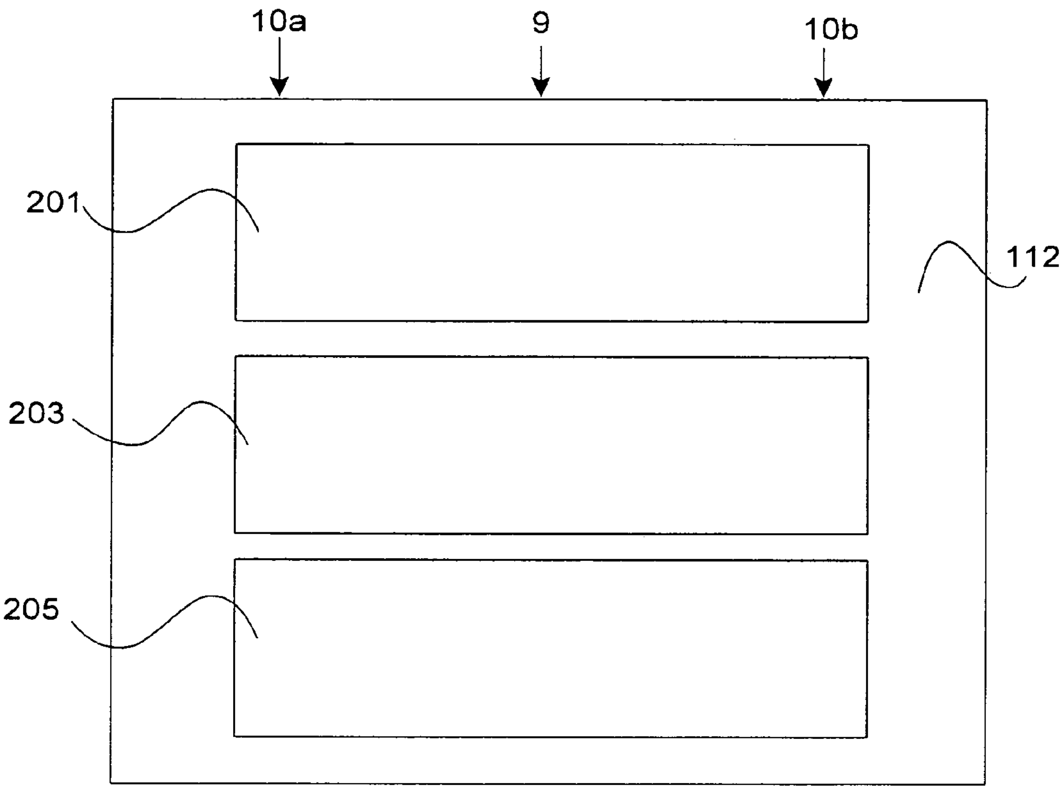
FIG. 3 is an illustration of one potential computerized control system that monitors and controls the operation of the various stations and mechanisms of a beverage bottling plant.

FIG. 3 shows one possible embodiment of a central control arrangement 112 which could be, for example, a computerized control system that monitors and controls the operation of the various stations and mechanisms of a beverage bottling plant.

In one possible embodiment, a central control arrangement 112 could conceivably be used to calculate the position of each bottle and/or each group of bottles as the bottles 7 travel through the various stations in a bottling plant. In one possible example, the speed, acceleration, quantity and/or quality of each bottle and/or each group of bottles is accounted for as they pass by the inspection points 10*a*, 9 and 10*b*. This data is then compared to the information that is collected at the inspection points immediately preceding and/or immediately following that particular inspection point.

In one possible example, the bottles 7 pass by inspection point 9 and the amount of time between each bottle and/or each platform on which bottles may be placed is measured. Then a prediction can be made about the number of bottles and/or possibly the time at which each bottle and/or each group of bottles that will then pass by inspection point 10*b*. By determining how fast or slowly the bottles are traveling as they pass by inspection point 9, an adjusted prediction can also be made about the time and the number of bottles, using the time when each bottle and/or each group of bottles passes, that will then pass by inspection point 10*b*.

In another possible embodiment, the bottles 7 pass by inspection point 9, and any missing and/or even damaged bottles are detected by the central control arrangement 112. By determining when bottles are missing or damaged as they pass by inspection point 9, an adjusted prediction can be made about the number of bottles or the time that it will take for the bottles to then pass by inspection point 10*b*.

In another possible embodiment, a fault message can be generated to indicate a possible problem in the bottling process when any missing and/or even damaged bottles are detected by the central control arrangement 112. Through the comparison of the information gathered at inspection points 9 and 10*b*, inconsistencies in the numbers of bottles or damage to bottles calculated by the central control arrangement 112 at each inspection point can quickly be identified.

In one possible embodiment, the recognition of inconsistencies or discrepancies in the information gathered when compared to anticipated information stored in the central control arrangement 112 may be able to indicate possible problems in an immediate and efficient manner, resulting in a fault message as soon as each discrepancy is acknowledged. By identifying problems, such as missing or broken bottles, as soon as they occur in the bottling process, damage to equipment or loss of productivity is minimized. Immediate identification of discrepancies in the bottling process may also aid in determining specifically where possible problems occur.

In one possible embodiment, an algorithm 201 calculates the position of each bottle or group of bottles as the bottles pass by inspection points 10*a*, 9, and 10*b*. As the speed of each bottle and/or each group of bottles accelerates or decelerates as they travel through the various stations of the bottling plant, the algorithm 201 detects the changes in speed and calculates the predicted time and/or number of bottles that will pass by the inspection points 9 and 10*b*. The change in the speed that each bottle and/or each group of bottles is traveling at between the inspection points is identified by the algorithm 201, and the new calculation prompts the necessary adjustments in the prediction of time and/or the number of bottles expected at each of the following inspection points.

In other possible embodiments, a sensor 203 detects each bottle and/or each group of bottles as the bottles pass by the inspection points 10*a*, 9, and 10*b*. As the bottles travel through the various stations of the bottling plant, the sensor 203 identifies spaces where any bottles are missing and/or even damaged. The sensor 203 detects the changes in quantity of bottles from one inspection point to another inspection point and calculates the predicted time and/or the number of bottles that will pass by the inspection points 9 and 10*b*. The change in the quantity of bottles and/or time due to empty spaces is identified by the sensor 203, and a fault message is sent. The new calculation prompts the necessary adjustments in the prediction of time and/or the number of bottles expected at each of the following inspection points.

In another possible embodiment, a counting camera sensor 205 of a computer software portion of the central control arrangement 112 captures the image of each bottle and/or each group of bottles as the bottles pass by the inspection points 10*a*, 9, and 10*b*. As the bottles travel through the various stations of the bottling plant, the counting camera sensor 205 captures the images of each bottle and/or each group of bottles and calculates the number of bottles that pass by the given inspection point. The counting camera sensor 205 captures the images of any changes in the quantity and/or quality of each bottle and/or each group of bottles from inspection point 10*a* and/or 9 to inspection point 9 and/or 10*b*. The computer software portion of the central control arrangement 112 then calculates the time and/or predicted number of bottles that will pass by the inspection points 9 and/or 10*b*. The change in the time and/or quantity and/or quality of each bottle and/or each group of bottles due to a problem in the bottling process is captured by the counting camera sensor 205 and the computer software portion of the central control arrangement 112, and a fault message is sent to an appropriate portion of the central control arrangement 112. The new calculation prompts the necessary adjustments in the prediction of time and/or the number of bottles expected at each of the following inspection points.

In another possible embodiment, the central control arrangement 112 could conceivably be used as part of a rejection system, an example of which is described by KHS Maschinen and Anlagenbau Aktiengesellschaft of Juchostrasse 20, D-44143 Dortmund, Germany, in their brochure (30 1992-01-035/2 2 0805 HM) entitled: "Everything under Control—with Inspection Technology from KHS Metec". In this possible embodiment, flawed bottles are kicked out of the main channel, as they travel through the various stages in the bottling plant, and into a rejection channel.

In another possible embodiment, the central control arrangement 112 could conceivably be used as part of a sorting system, an example of which is described by KHS Maschinen and Anlagenbau Aktiengesellschaft of Juchostrasse 20, D-44143 Dortmund, Germany, in their brochure (30 1992-01-035/2 2 0805 HM) entitled: "Everything under Control—with Inspection Technology from KHS Metec". In this possible embodiment, bottles are diverted out of the main channel, as they travel through the various stages in the bottling plant, and into other appropriate channels based on the different requirements of the bottles.

In other possible embodiments, the central control arrangement 112 could conceivably be used at various points in a bottling plant to monitor, record, and/or inspect each bottle and/or each group of bottles, an example of which is described by KHS Maschinen and Anlagenbau Aktiengesellschaft of Juchostrasse 20, D-44143 Dortmund, Germany, in their brochure (30 1992-01-035/2 2 0805 HM) entitled: "Everything under Control—with Inspection Technology from KHS Metec". In various possible embodiments, the central control arrangement 112 could be used to generate a signal(s) to sorting equipment, rejection equipment, labeling equipment, de-labeling equipment, washing equipment, distribution equipment, and/or tracking equipment as bottles travel through the various stations in the bottling plant.

In one possible embodiment, the central control arrangement 112 could conceivably be used to sort, decap and/or delabel, an example of which is described by KHS Maschinen and Anlagenbau Aktiengesellschaft of Juchostrasse 20, 44143 Dortmund, Germany, in their brochure (30 1992-01-032/2 2 0801 HM) entitled: "Foreign Substance Detection Combined with Decapping and Delabelling". In one possible embodiment, the computer software portion of the central control arrangement 112 could be used to generate a signal to the appropriate equipment in various parts of the bottling process, which prompts an appropriate response in said equipment. By separating bottles for various sorting, decapping, and/or delabeling purposes as they continue to move through the bottling plant, interruptions in production are minimized and efficiency is optimized.

In other possible embodiments, the central control arrangement 112 may be used to collect and store information on how often damage occurs to bottles and how often flawed bottles are kicked out.

In other possible embodiments, the central control arrangement 112 may be used to provide information to do a statistical analysis to determine how many broken or damaged bottles are allowed to occur and/or rejected.

In other possible embodiments, the central control arrangement 112 may be used to determine how many fault messages are generated before one or more pieces of equipment are shut down.

In other possible embodiments, the central control arrangement 112 may consist of only one or a combination of more than one counting camera sensor 205, sensor 203, and/or algorithm 201.

Figure 4:
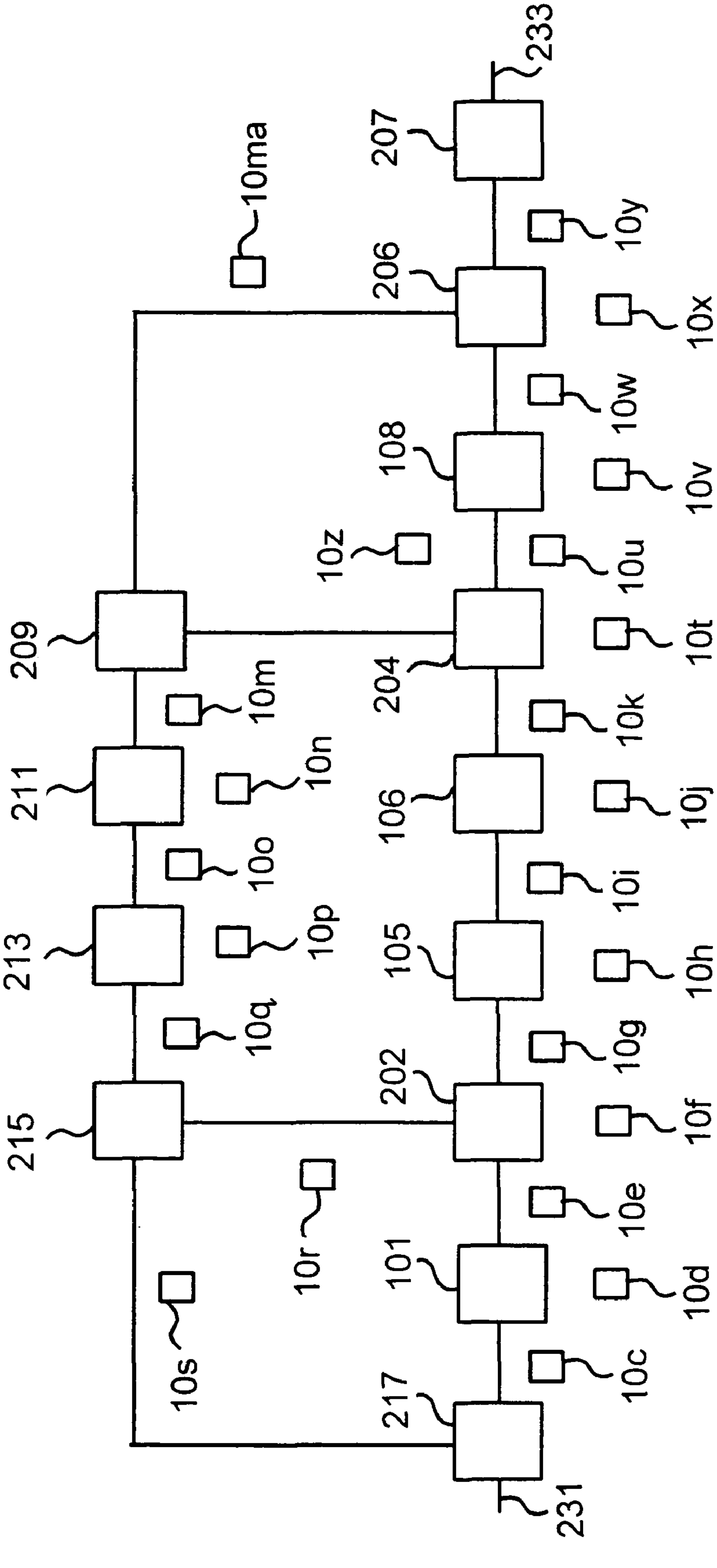
FIG. 4 is an overhead view of a container handling and treatment plant that is similar to the plant illustrated in FIG. 1A.

FIG. 4 shows one possible embodiment of a liquid bottling plant having a rinsing arrangement or rinsing station 101, a beverage filling machine 105, a beverage bottle closing arrangement or closing station 106, a beverage bottle labeling arrangement or labeling station 108, and a packaging station 207. In one possible example, each bottle and/or each group of bottles travels from the input line to merging station 217, and then to the rinsing arrangement or rinsing station 101. The progress of the bottles is monitored by the inspection points 10*c*, 10*d*, and 10*e* as each bottle and/or each group of bottles passes. In one possible example, a rejection station 202, such as Innocheck ROTOPUSH or Innocheck SYNCHRON, made by KHS, located between the rinsing arrangement or rinsing station 101 and the beverage filling machine 105, may be used to separate the defective bottles from the acceptable bottles. In one possible example, the information collected at the inspection points may prompt a response in the rejection station 202, which would result in the bottle(s) being kicked out and sent to the merging stations 215 and 217 before being reintroduced to the rinsing arrangement or rinsing station 101. As the defective or faulty bottles proceed from the rejection station 202 to the merging station 215, the bottles are inspected at the inspection point 10*r*, and the bottles pass another inspection point 10*s* on their way from the merging station 215 to the merging station 217.

In one possible embodiment, each bottle and/or each group of bottles travels past the rejection station 202 to the beverage filling station and the beverage bottle closing arrangement or closing station 106, the bottles are monitored at inspection points 10*f*, 10*g*, 10*h*, 10*i*, and 10*j*. After each bottle and/or each group of bottles is closed, the bottles are inspected again as they pass the inspection point 10*k*, and any detected discrepancies may result in defective or faulty bottles being kicked out at the rejection station 204. As the bottles travel from the rejection station 204 to the merging station 209, each bottle and/or each group of bottles is inspected at the inspection point z. The defective or faulty bottles are then directed to the merging station 209 before continuing on to the decapping and delabeling station 211 and the emptying station 213. As the bottles proceed from the merging station 209 to the decapping and delabeling station 211, the emptying station 213, and the merging station 215, the bottles pass inspection points 10*m*, 10*n*, 10*o*, 10*p*, and 10*q*. Finally, the defective or faulty bottles travel through the merging stations 215 and 217 before being reintroduced to the rinsing arrangement or rinsing station 101.

In one possible embodiment, each bottle and/or each group of bottles moves past the rejection station 204, toward the beverage bottle labeling arrangement or labeling station 108, and the bottles pass inspection points 10*t* and 10*u*. Each bottle and/or group of bottles is inspected again at inspection points 10*v* and 10*w* before reaching the rejection station 206. If defective or faulty bottles are detected, the bottles are kicked out at the rejection station 206 before reaching the packaging station 207. The defective or faulty bottles are then directed to the merging station 209. As the defective or faulty bottles travel from the rejection station 206 to the merging station 209, the bottles are inspected again at the inspection point 10*ma*. The bottles proceed from the merging station 209 to the decapping and delabeling station 211, the emptying station 213, and the merging stations 215 and 217 before being reintroduced to the rinsing arrangement or rinsing station 101.

In one possible embodiment, each bottle and/or each group of bottles is inspected one last time at inspection point 10*y* before reaching the packaging station 207. From the packaging station 207 the bottles proceed to the output line 233.

Figure 5:
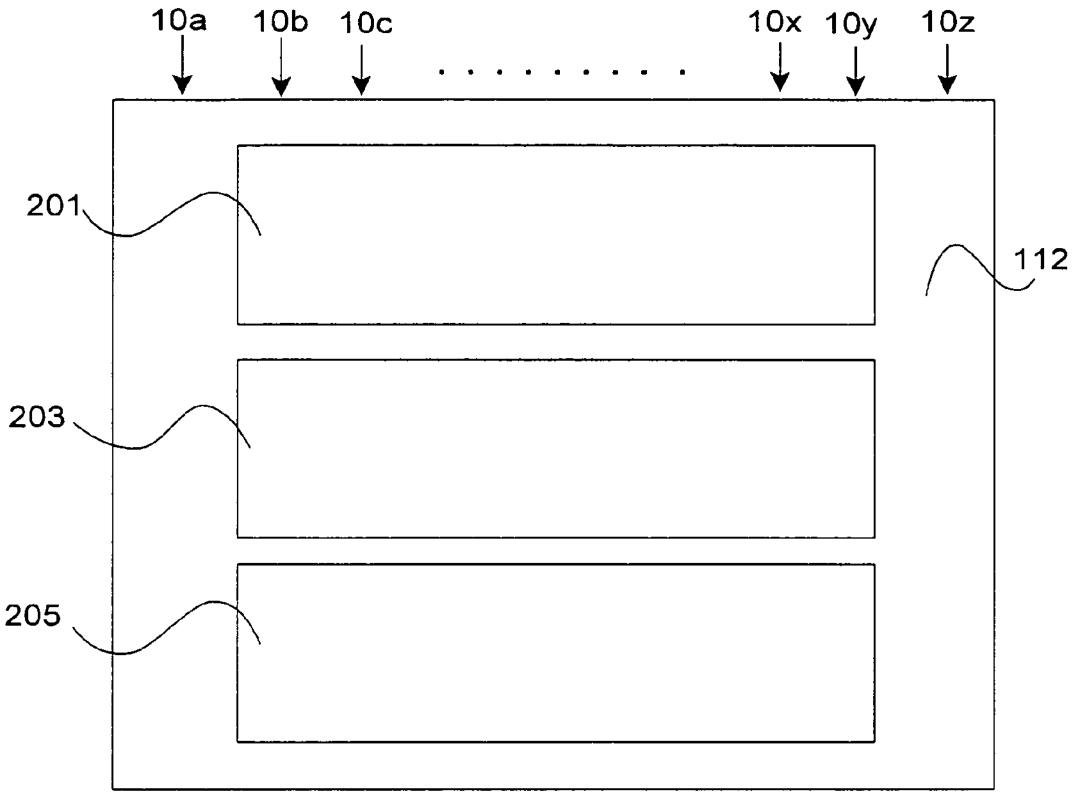
FIG. 5 is an illustration similar to FIG. 3 and shows additional possible realizations of the computerized control system according to at least one possible embodiment.

FIG. 5 shows, in a presentation that is similar to FIG. 3, an additional possible embodiment of a central control arrangement 112, in which inspection points 10*a, b, c . . . x, y*, and *z* are used as part of a computerized control system that monitors and controls the operation of the various stations and mechanisms of a beverage bottling plant. Between inspection points 10*c* and 10*x*, inspection points 10*d* through 10*v* are represented by " . . . . . . . . . ".

Figure 6:
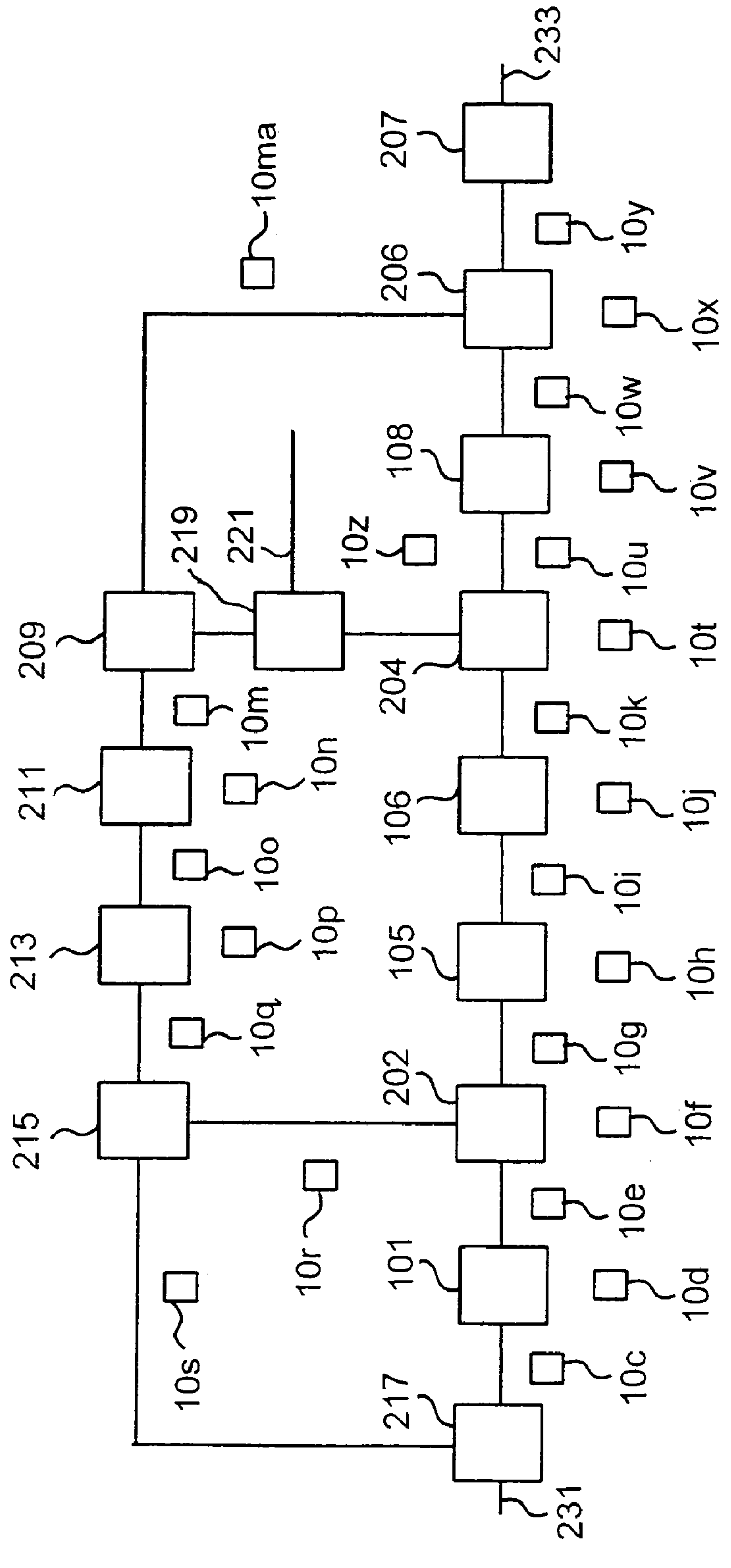
FIGS. 6, 7, and 8 are illustrations similar to FIG. 4 and show additional possible realizations of the method and apparatus for the monitoring of a container handling and treatment station.
Figure 7:
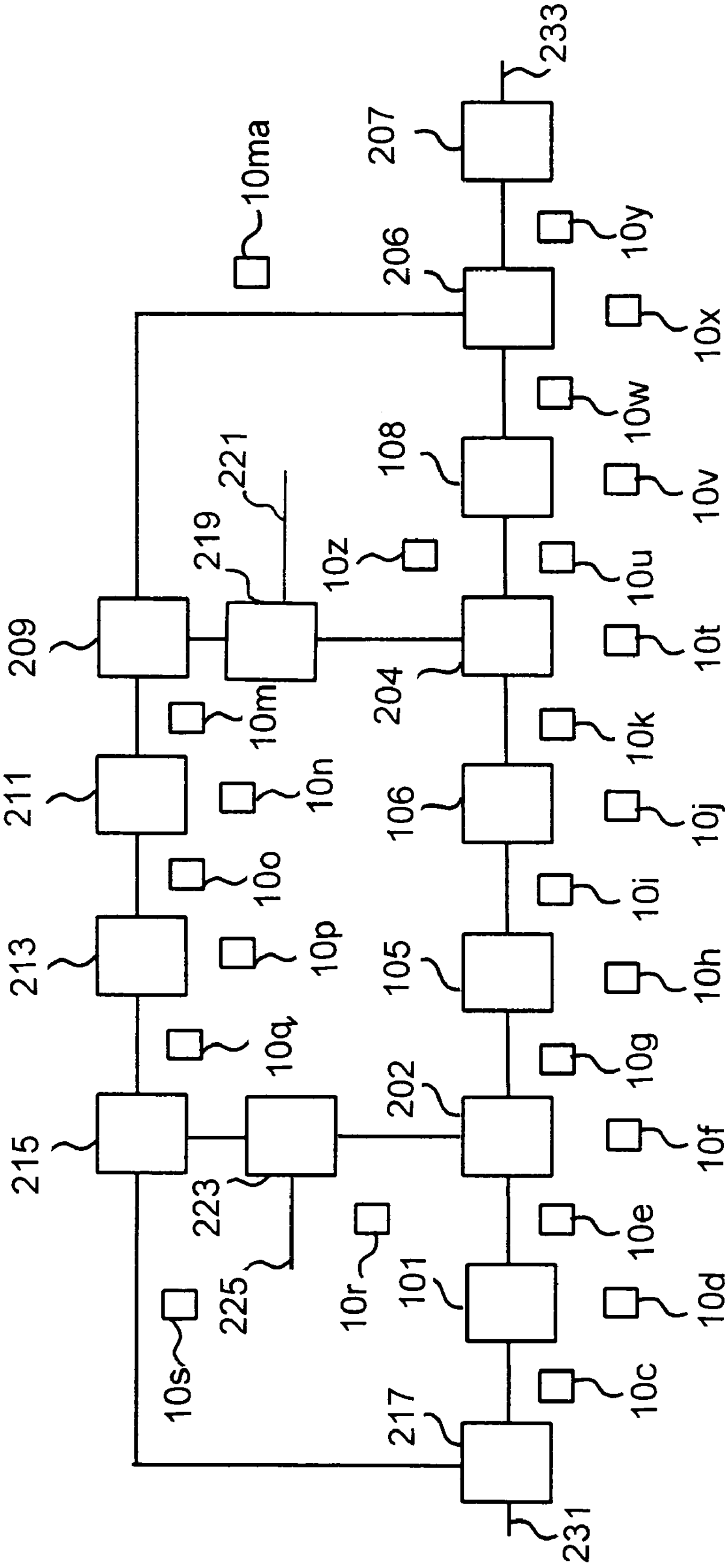
Figure 8:
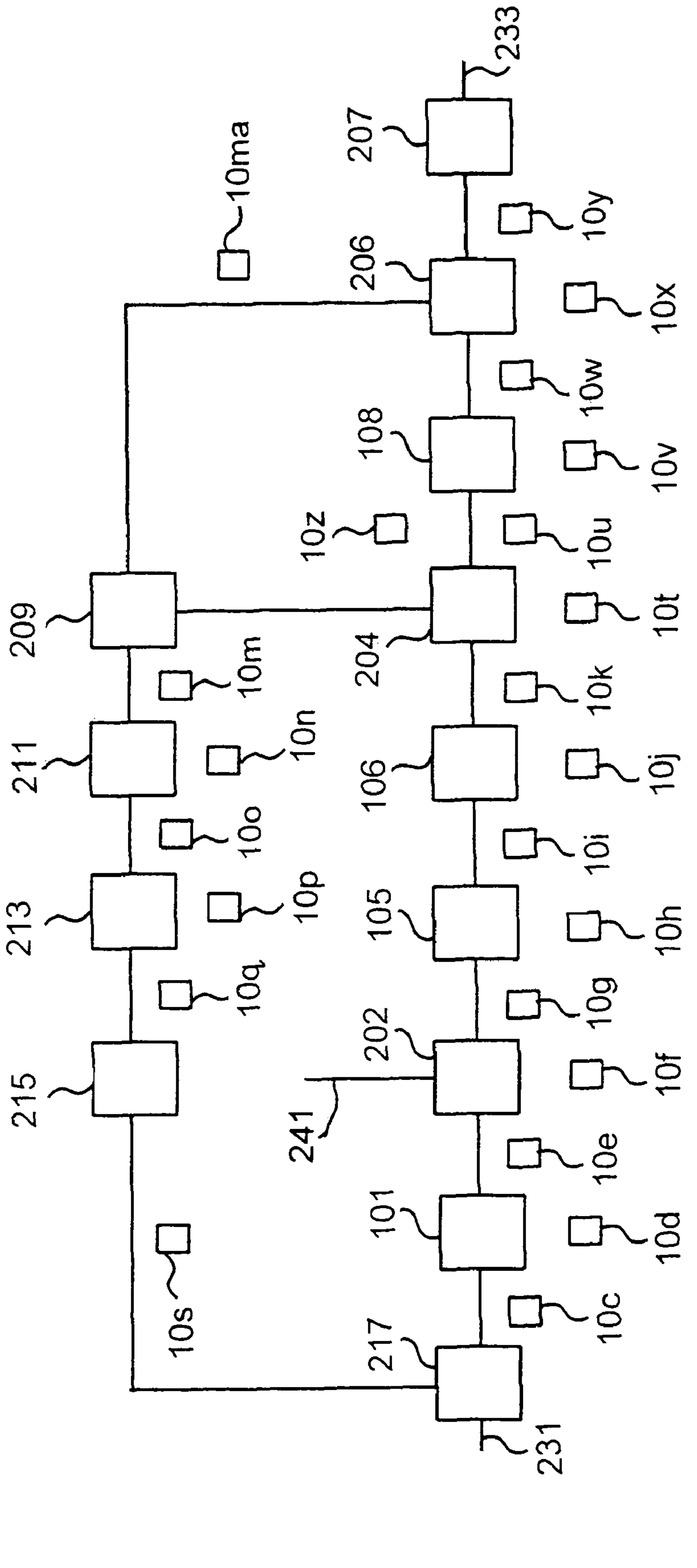

FIGS. 6, 7, and 8 show, in a presentation that is similar to FIG. 4, additional possible embodiments of a liquid bottling plant, in which a computerized control system monitors and controls the operation of the various stations and mechanisms of a beverage bottling plant.

FIG. 6 differs from FIG. 4, in that an additional rejection station 219 is located on the path between the rejection station 204 and the merging station 209. As each bottle and/or each group of bottles travels from the rejection station 204 to the merging station 209, the bottles are inspected at the inspection point 10*z*. In one possible example, the information collected at the inspection point 10*z* may result in defective or faulty bottles being kicked out at the rejection station 219. The defective or faulty bottles then proceed to the discard line 221, which in one possible embodiment, may lead to a recycling station.

FIG. 7 differs from FIG. 4, in that an additional rejection station 219 is located on the path between the rejection station 204 and the merging station 209, and an additional rejection station 223 is located on the path between the rejection station 202 and the merging station 215.

As each bottle and/or each group of bottles travels from the rejection station 202 to the merging station 215, the bottles are inspected at the inspection point 10*r*. In one possible example, the information collected at the inspection point 10*r* may result in defective or faulty bottles being kicked out at the rejection station 223. The defective or faulty bottles then proceed to the discard line 225, which in one possible embodiment, may lead to an area which prevents the defective or faulty bottles from being recirculated. In another possible embodiment, the defective or faulty bottles may proceed to the discard line 225, and on to a recycling station.

As each bottle and/or each group of bottles travels from the rejection station 204 to the merging station 209, the bottles are inspected at the inspection point 10*z*. In one possible example, the information collected at the inspection point 10*z* may result in defective or faulty bottles being kicked out at the rejection station 219. The defective or faulty bottles then proceed to the discard line 221, which in one possible embodiment, may lead to an area which prevents the defective or faulty bottles from being recirculated. In another possible embodiment, the defective or faulty bottles may proceed to the discard line 221, and on to a recycling station.

FIG. 8 differs from FIG. 4, in that each bottle and/or each group of bottles that is kicked out at the rejection station 202 travels directly to the discard line 241, which in one possible embodiment, may lead to an area which prevents the defective or faulty bottles from being recirculated. In another possible embodiment, the defective or faulty bottles may proceed to the discard line 241, and on to a recycling station.

In other possible embodiments, only one or a combination of more than one rejection station may be used to separate, sort, and/or discard defective and/or unacceptable bottles from acceptable bottles in a bottling plant.

In other possible embodiments, several and/or a multiplicity of rejection stations may be used in several and/or a multiplicity of locations in a bottling plant.

In particular when there is reason to expect rough operating conditions, as in the beverage industry, for example, the measurement devices can also be realized with a cleaning system. This cleaning system can be a flow medium source for the spraying or blowing of phototechnical equipment on the measurement devices or another type of cleaning device.

One feature or aspect of an embodiment is believed at the time of the filing of this patent application to possibly reside broadly in a method for the monitoring of an automatic container handling and treatment machine such as a bottling, capping and labeling machine for the correct and error-free handling and treatment of the containers to be processed such as bottles, cans and similar containers, characterized in that with a first inspection measure, the number of containers 7 input one after another is recorded, and with a second inspection measure, the number of containers 7 output one after another is recorded, and when there is a change in the number of exiting containers a fault message is generated, which is used for the immediate or later action for the operation of the handling and treatment machine 2, 6.

Yet another feature or aspect of an embodiment is believed at the time of the filing of this patent application to possibly reside broadly in a method for the monitoring of an automatic container handling and treatment machine such as a bottling, capping and labeling machine for the correct and error-free handling and treatment of the containers to be processed such as bottles, cans and similar containers, as characterized in that the fault message triggers an immediate stop signal for the handling and treatment machine 2, 6.

Still another feature or aspect of an embodiment is believed at the time of the filing of this patent application to possibly reside broadly in a method for the monitoring of an automatic container handling and treatment machine such as a bottling, capping and labeling machine for the correct and error-free handling and treatment of the containers to be processed such as bottles, cans and similar containers, characterized in that a plurality of fault signals are stored, and after the input of a specified number or frequency of such signals, a stop signal for the handling and treatment machine 2, 6 is triggered.

A further feature or aspect of an embodiment is believed at the time of the filing of this patent application to possibly reside broadly in method for the monitoring of an automatic container handling and treatment machine such as a bottling, capping and labeling machine for the correct and error-free handling and treatment of the containers to be processed such as bottles, cans and similar containers, characterized in that when handling and treatment machines 2, 6 work together in a handling and treatment plant, the number of containers 7 input and output is determined separately for the input and output sides of the machine, and when a fault signal is emitted by any machine 2, 6, the handling and treatment machines 2, 6 that are arranged in sequence can be shut down one after another in the flow direction.

Another feature or aspect of an embodiment is believed at the time of the filing of this patent application to possibly reside broadly in method for the monitoring of an automatic container handling and treatment machine such as a bottling, capping and labeling machine for the correct and error-free handling and treatment of the containers to be processed such as bottles, cans and similar containers, characterized in that the individual handling and treatment machines 2, 6 that are arranged one after another cannot be shut down before they are emptied.

Yet another feature or aspect of an embodiment is believed at the time of the filing of this patent application to possibly reside broadly in method for the monitoring of an automatic container handling and treatment machine such as a bottling, capping and labeling machine for the correct and error-free handling and treatment of the containers to be processed such as bottles, cans and similar containers, characterized in that the inspection segments that are located between the inspection points 9, 10 can be divided into additional individual inspection segments and analyzed individually.

Still another feature or aspect of an embodiment is believed at the time of the filing of this patent application to possibly reside broadly in method for the monitoring of an automatic container handling and treatment machine such as a bottling, capping and labeling machine for the correct and error-free handling and treatment of the containers to be processed such as bottles, cans and similar containers, characterized in that the individual inspection segments can be evaluated together.

A further feature or aspect of an embodiment is believed at the time of the filing of this patent application to possibly reside broadly in method for the monitoring of an automatic container handling and treatment machine such as a bottling, capping and labeling machine for the correct and error-free handling and treatment of the containers to be processed such as bottles, cans and similar containers, characterized in that for the input-side and output-side counting, recording and continuous comparison of the number of containers 8 that flow between the inspection segments, a central control unit is provided, the evaluation results of which are used for the actuation of the handling and treatment machine 2, 6.

Another feature or aspect of an embodiment is believed at the time of the filing of this patent application to possibly reside broadly in apparatus for the performance of the method for the monitoring of an automatic container handling and treatment machine such as a bottling, capping and labeling machine for the correct and error-free handling and treatment of the containers to be processed such as bottles, cans and similar containers, characterized in that the control unit has a processing device for the storage of a signal corresponding to the number of containers in an inspection segment, for the receipt of inputs and counting pulses of the containers 7 measured at the inspection points 9, 10 and for the storage of the number of containers counted and for the comparison of these data for the output of a fault signal.

Yet another feature or aspect of an embodiment is believed at the time of the filing of this patent application to possibly reside broadly in apparatus for the monitoring of an automatic container handling and treatment machine such as a bottling, capping and labeling machine for the correct and error-free handling and treatment of the containers to be processed such as bottles, cans and similar containers, characterized in that the inspection points 9, 10 have at least one photocell counting device and/or at least one counting camera.

Still another feature or aspect of an embodiment is believed at the time of the filing of this patent application to possibly reside broadly in apparatus for the monitoring of an automatic container handling and treatment machine such as a bottling, capping and labeling machine for the correct and error-free handling and treatment of the containers to be processed such as bottles, cans and similar containers, characterized in that measurement sensors that respond to reflection are provided at the inspection points 9, 10.

A further feature or aspect of an embodiment is believed at the time of the filing of this patent application to possibly reside broadly in apparatus for the monitoring of an automatic container handling and treatment machine such as a bottling, capping and labeling machine for the correct and error-free handling and treatment of the containers to be processed such as bottles, cans and similar containers, characterized in that the counting devices are realized with a cleaning system and the cleaning system has a source of flow medium.

This application further relates to a method for the monitoring an automatic container handling and treatment machine such as a bottling, capping and labeling machine for the correct and error-free handling and treatment of the containers to be processed such as bottles, cans and similar containers, and is characterized in that with a first inspection measure, the number of containers input one after another is recorded and with a second inspection measure, the number of containers output one after another is recorded, and when there is a change in the number of containers output a fault message is generated which is used for the immediate or later action for the operation of the handling and treatment machine.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The corresponding foreign and international patent publication applications, namely, Federal Republic of Germany Patent Application No. 10 2005 031 794.4, filed on Jul. 7, 2005, having inventor Herbert BERNHARD, and DE-OS 10 2005 031 794.4 and DE-PS 10 2005 031 794.4, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method for the monitoring of an automatic container handling and treatment machine comprising one of: a bottling machine, a capping machine, and a labeling machine, for the correct and error-free handling and treatment of the containers to be processed such as bottles, cans and similar containers, wherein with a first inspection measure, the number of containers input one after another into said handling and treatment machine is recorded, and with a second inspection measure, the number of containers output one after another out of said handling and treatment machine is recorded, and when there is a difference between the number of entering containers and exiting containers a fault message is generated, which is used for the immediate or later action for the operation of the handling and treatment machine.

2. A method for the monitoring of an automatic container handling and treatment machine comprising one of: a bottling machine, a capping machine, and a labeling machine, for the correct and error-free handling and treatment of the containers to be processed such as bottles, cans and similar containers, wherein with a first inspection measure, the number of containers input one after another is recorded, and with a second inspection measure, the number of containers output one after another is recorded, and when there is a change in the number of exiting containers a fault message is generated, which is used for the immediate or later action for the operation of the handling and treatment machine, and wherein one of:

the fault message triggers an immediate stop signal for the handling and treatment machine; and a plurality of fault signals are stored, and after the input of a specified number or frequency of such signals, a stop signal for the handling and treatment machine is triggered.

3. The method as claimed in claim 2, wherein when handling and treatment machines work together in a handling and treatment plant, the number of containers input and output is determined separately for the input and output sides of the machine, and when a fault signal is emitted by any machine, the handling and treatment machines that are arranged in sequence can be shut down one after another in the flow direction.

4. The method as claimed in claim 3, wherein:

the individual handling and treatment machines that are arranged one after another cannot be shut down before they are emptied; and the inspection segments that are located between the inspection points can be divided into additional individual inspection segments and analyzed individually.

5. The method as claimed in claim 4, wherein:

the individual inspection segments can be evaluated together; and for the input-side and output-side counting, recording and continuous comparison of the number of containers that flow between the inspection segments, a central control unit is provided, the evaluation results of which are used for the actuation of the handling and treatment machine.

6. An apparatus for the performance of the method claimed in claim 2, wherein said apparatus comprises a control unit which has a processing device for the storage of a signal corresponding to the number of containers in an inspection segment, for the receipt of inputs and counting pulses of the containers measured at the inspection points and for the storage of the number of containers counted and for the comparison of these data for the output of a fault signal.

7. The apparatus as claimed in claim 6, wherein:

the inspection points have at least one photocell counting device and/or at least one counting camera and wherein measurement sensors that respond to reflection are provided at the inspection points; and said apparatus comprises a cleaning system configured to clean said counting devices and the cleaning system has a source of flow medium.

8. A method for the monitoring of an automatic container handling and treatment arrangement comprising at least one automatic container handling and treatment machine, said automatic container handling and treatment machine comprising one of: a container filling machine, a container closing machine, or a container labeling machine, for the handling and treatment of containers, such as bottles, cans, and similar containers, said method comprising the steps of:

determining an amount of transport time required to transport a single container through said automatic container handling and treatment arrangement;

feeding containers into said automatic container handling and treatment arrangement one after another at a predetermined time interval between successive containers;

counting and recording the feeding of each container into said automatic container handling and treatment arrangement one after another beginning with a first container;

recording an input time at which said first container is fed into said automatic container handling and treatment arrangement;

determining a predicted discharge time at which said first container would be expected to be discharged from said automatic container handling and treatment arrangement based on said transport time and said input time;

transporting said containers through said automatic container handling and treatment arrangement;

discharging containers from said automatic container handling and treatment arrangement one after another at said predetermined time interval between successive containers;

beginning inspecting, at said predicted discharge time of said first container, for expected containers to be discharged at said predetermined time interval between successive containers;

counting and recording the discharge of each discharged container at said predetermined time interval between successive containers, and, upon detecting the absence of an expected container to be discharged or detecting damage of a discharged container, generating a fault signal; and one of (A) and (B):

(A) upon generation of a fault signal, immediately stopping said automatic container handling and treatment arrangement; and (B) upon generation of a fault signal, storing said fault signal and continuing operating and monitoring said automatic container handling and treatment arrangement until a predetermined number or predetermined frequency of fault signals are generated, then stopping said automatic container handling and treatment arrangement.

9. The method according to claim 8, wherein said method comprises immediately stopping said automatic container handling and treatment arrangement upon generation of a fault signal.

10. The method as claimed in claim 9, wherein said automatic container handling and treatment arrangement comprises at least two automatic container handling and treatment machines, and said method further comprises:

monitoring the input and output of containers for each automatic container handling and treatment machine individually and separately; and upon generation of a fault signal for the operation of one of said automatic container handling and treatment machines, shutting down said automatic container handling and treatment machines that are arranged in sequence one after another in the flow direction of containers.

11. The method as claimed in claim 10, wherein said method further comprises discharging all containers from said automatic container handling and treatment machines prior to shut down.

12. The method as claimed in claim 11, wherein:

said method further comprises monitoring segments between the container input and container output of each automatic container handling and treatment machine can be divided into additional individual inspection segments; and analyzing each segment either individually or together.

13. The method as claimed in claim 12, wherein said method further comprises using a central control system to perform the following steps:

determining an amount of transport time required to transport a single container through said automatic container handling and treatment arrangement;

determining a predicted discharge time at which said first container would be expected to be discharged from said automatic container handling and treatment arrangement based on said transport time and said input time;

comparing expected containers to be discharged at said predetermined time interval between successive containers with discharged containers counted and recorded by said second counting and recording arrangement, and, upon detecting the absence of an expected container to be discharged or detecting damage of a discharged container, generating a fault signal; and one of (A) and (B):

(A) upon generation of a fault signal, immediately stopping said automatic container handling and treatment arrangement; and (B) upon generation of a fault signal, storing said fault signal and continuing operating and monitoring said automatic container handling and treatment arrangement until a predetermined number or predetermined frequency of fault signals are generated, then stopping said automatic container handling and treatment arrangement.

14. The method according to claim 8, wherein said method comprises storing said fault signal, upon generation of a fault signal, and continuing operating and monitoring said automatic container handling and treatment arrangement until a predetermined number or predetermined frequency of fault signals are generated, then stopping said automatic container handling and treatment arrangement.

15. The method as claimed in claim 14, wherein said automatic container handling and treatment arrangement comprises at least two automatic container handling and treatment machines, and said method further comprises:

monitoring the input and output of containers for each automatic container handling and treatment machine individually and separately; and upon generation of a fault signal for the operation of one of said automatic container handling and treatment machines, shutting down said automatic container handling and treatment machines that are arranged in sequence one after another in the flow direction of containers.

16. The method as claimed in claim 15, wherein said method further comprises discharging all containers from said automatic container handling and treatment machines prior to shut down.

17. The method as claimed in claim 16, wherein:

said method further comprises monitoring segments between the container input and container output of each automatic container handling and treatment machine can be divided into additional individual inspection segments; and analyzing each segment either individually or together.

18. The method as claimed in claim 17, wherein said method further comprises using a central control system to perform the following steps:

determining an amount of transport time required to transport a single container through said automatic container handling and treatment arrangement;

determining a predicted discharge time at which said first container would be expected to be discharged from said automatic container handling and treatment arrangement based on said transport time and said input time;

comparing expected containers to be discharged at said predetermined time interval between successive containers with discharged containers counted and recorded by said second counting and recording arrangement, and, upon detecting the absence of an expected container to be discharged or detecting damage of a discharged container, generating a fault signal; and one of (A) and (B):

(A) upon generation of a fault signal, immediately stopping said automatic container handling and treatment arrangement; and (B) upon generation of a fault signal, storing said fault signal and continuing operating and monitoring said automatic container handling and treatment arrangement until a predetermined number or predetermined frequency of fault signals are generated, then stopping said automatic container handling and treatment arrangement.

19. An arrangement for performing the method according to claim 8 for the monitoring of said automatic container handling and treatment arrangement, said arrangement comprising:

a central control system being configured to determine an amount of transport time required to transport a single container through said automatic container handling and treatment arrangement;

an infeed device being configured to feed containers into said automatic container handling and treatment arrangement one after another at a predetermined time interval between successive containers;

a first counting and recording arrangement being configured to count and record the feeding of each container into said automatic container handling and treatment arrangement one after another beginning with a first container, and to record an input time at which said first container is fed into said automatic container handling and treatment arrangement;

said central control system being configured to determine a predicted discharge time at which said first container would be expected to be discharged from said automatic container handling and treatment arrangement based on said transport time and said input time;

a discharge device being configured to discharge containers from said automatic container handling and treatment arrangement one after another at said predetermined time interval between successive containers;

a second counting and recording arrangement being configured to count and record the discharge of each discharged container at said predetermined time interval between successive containers;

said central control system being configured to compare expected containers to be discharged at said predetermined time interval between successive containers with discharged containers counted and recorded by said second counting and recording arrangement, and, upon detecting the absence of an expected container to be discharged or detecting damage of a discharged container, generating a fault signal; and said central control system being configured to one of (A) and (B):

(A) upon generation of a fault signal, immediately stopping said automatic container handling and treatment arrangement; and (B) upon generation of a fault signal, storing said fault signal and continuing operating and monitoring said automatic container handling and treatment arrangement until a predetermined number or predetermined frequency of fault signals are generated, then stopping said automatic container handling and treatment arrangement.

20. The apparatus as claimed in claim 19, wherein:

said counting and recording arrangements each comprise: at least one photocell counting device and/or at least one counting camera; and measurement sensors configured to respond to reflection; and said automatic container handling and treatment arrangement comprises a cleaning system having a source of flow medium.

* * * * *